(12) United States Patent
Myers et al.

(10) Patent No.: US 7,325,821 B2
(45) Date of Patent: Feb. 5, 2008

(54) SUSPENSION MOUNTING SYSTEM AND A METHOD OF ASSEMBLING THE SAME

(75) Inventors: Gary M. Myers, Oshtemo, MI (US); Nick E. Wainscott, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 11/476,323

(22) Filed: Jun. 28, 2006

(65) Prior Publication Data

US 2008/0001379 A1    Jan. 3, 2008

(51) Int. Cl.
*B60B 35/16* (2006.01)
*B60G 9/00* (2006.01)

(52) U.S. Cl. .............. 280/124.156; 74/607; 301/124.1; 301/137

(58) Field of Classification Search ......... 280/124.156, 280/124.175, 124.116; 301/124.1, 137; 74/606 R, 74/607
See application file for complete search history.

(56) References Cited

U.S. PATENT DOCUMENTS

| | | | | |
|---|---|---|---|---|
| 1,227,378 A | * | 5/1917 | Brady | 74/607 |
| 1,252,812 A | * | 1/1918 | Klocke | 74/607 |
| 1,385,483 A | * | 7/1921 | Carter | 228/136 |
| 2,480,833 A | | 9/1949 | Buckendale | |
| 2,674,783 A | | 4/1954 | Schneider et al. | |
| 3,041,890 A | * | 7/1962 | O'Brien | 74/607 |
| 3,673,888 A | | 7/1972 | Moll et al. | |
| 3,793,703 A | | 2/1974 | Winkler et al. | |
| 4,375,896 A | | 3/1983 | Barnes | |
| 4,684,110 A | * | 8/1987 | Sale et al. | 267/52 |
| 4,760,755 A | | 8/1988 | Peck | |
| 4,921,159 A | | 5/1990 | Peck | |
| 4,969,634 A | * | 11/1990 | Bellingham | 267/52 |
| 5,328,159 A | * | 7/1994 | Kaufman et al. | 267/52 |
| 5,333,896 A | * | 8/1994 | Creighton | 280/124.156 |
| 5,476,251 A | * | 12/1995 | Moses et al. | 267/52 |
| 6,032,967 A | * | 3/2000 | Ogoniek | 280/124.175 |
| 6,270,282 B1 | * | 8/2001 | McLaughlin | 403/158 |
| 6,412,879 B1 | | 7/2002 | Ogoniek et al. | |
| 6,543,797 B2 | * | 4/2003 | Van Schmus et al. | 280/124.104 |
| 6,543,857 B1 | * | 4/2003 | Griffiths et al. | 301/127 |
| 6,595,085 B1 | * | 7/2003 | Osenbaugh | 74/607 |
| 6,609,649 B1 | | 8/2003 | Barnholt et al. | |
| 6,793,227 B1 | * | 9/2004 | Weisgerber et al. | 280/124.119 |
| 7,175,190 B2 | * | 2/2007 | Reineck | 280/124.17 |
| 7,260,879 B2 | * | 8/2007 | Koschinat | 29/525.11 |
| 2003/0110885 A1 | * | 6/2003 | Beutler | 74/606 R |
| 2004/0155424 A1 | * | 8/2004 | Hicks et al. | 280/124.17 |
| 2005/0168057 A1 | * | 8/2005 | Eschenburg | 301/137 |
| 2006/0001312 A1 | * | 1/2006 | MacKarvich | 301/124.1 |

* cited by examiner

*Primary Examiner*—Eric Culbreth
*Assistant Examiner*—Joseph Rocca
(74) *Attorney, Agent, or Firm*—Marshall & Melhorn LLC

(57) ABSTRACT

A suspension mounting system and a method of assembly of the same are disclosed. The system has an axle housing having two hollow arms and an upper portion and a lower portion. At least one suspension bracket is located between the upper portion and the lower portion and through one of the hollow arms.

15 Claims, 4 Drawing Sheets

SUSPENSION MOUNTING SYSTEM AND A METHOD OF ASSEMBLING THE SAME

FIELD OF THE INVENTION

The present invention relates to a suspension mounting system for an axle of a vehicle and a method of assembling the same.

BACKGROUND OF THE INVENTION

Axle housings for vehicles are well-known by those skilled in the art for housing axle shafts, as well as differentials. Axle housings are also well-known to those skilled in the art for mounting and/or securing various structures, such as suspensions components, thereto.

There are many prior art devices designed to attach to the axle housing so that suspension components can be attached to it. For example, U.S. Pat. No. 4,375,896 teaches that a hanger bracket for a suspension member is welded to an outside surface of an axle housing. The hanger bracket is welded to the housing so as to surround the lower hemisphere of the axle housing. Two screws are located through two apertures on either side of the bracket contact the exterior of the axle housing to help distribute a twisting type load.

U.S. Pat. No. 5,476,251 also teaches a hanger bracket for a suspension member that is attached to the outside surface of an axle housing. The hanger bracket is secured to the axle housing by bolts that are secured at one end to the hanger bracket and secured at the other end to, or about, the axle housing. Welding is also used to secure the hanger bracket to the axle housing. Specifically, a weld is located in a window of the hanger bracket. The window is located on an upstanding side portion of the hanger bracket and thus provides access to a side of the axle housing. A weld may also be located along the top portion of the hanger bracket where it abuts the axle housing.

The prior art devices discussed above, as well as other similar prior art devices, suffer from several drawbacks. While not specifically mentioned in the prior art patents above, it is common to attach suspension components to hanger brackets with U-bolts. The bolts are costly as they are typically constructed of high strength steel. Some bolts must be quite long as they must extend from below the axle housing to about the suspension member. Secondly, the prior art devices are complicated and cumbersome to secure to the axle housing. More particularly, the prior art devices require them to be separately attached to the axle housing, such as by welding. In light of at least these disadvantages, it would be advantageous to have a system for attaching components to an axle housing that was inexpensive and easy to use.

SUMMARY OF THE INVENTION

The present invention is directed toward a suspension mounting system for a vehicle and a method of assembling the same. The suspension mounting system has an axle housing with two hollow arms and an upper portion and a lower portion. At least one suspension bracket is located between the upper portion and the lower portion and through one of the hollow arms.

BRIEF DESCRIPTION OF THE DRAWINGS

The advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
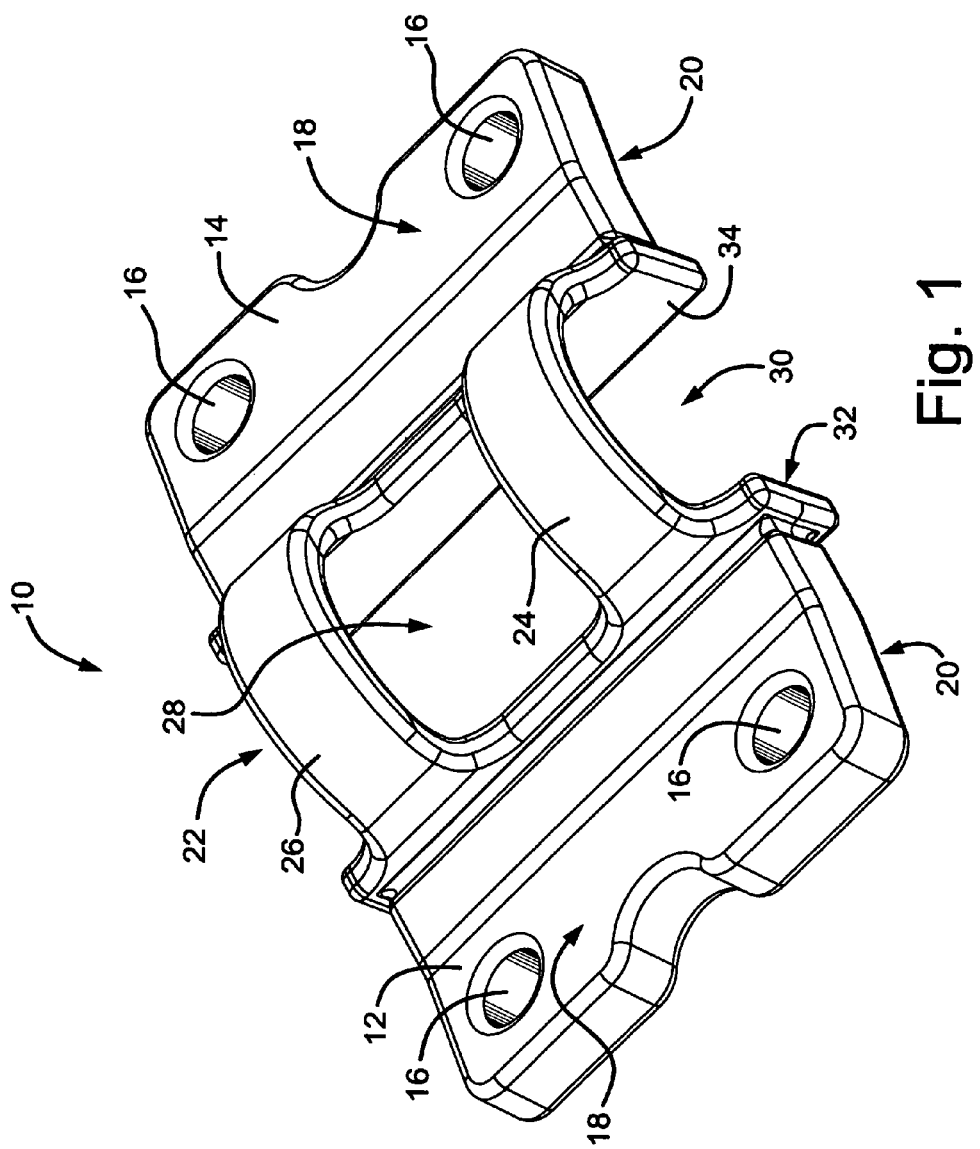
FIG. 1 is a schematic, perspective view of an embodiment of a suspension bracket of the present invention.
Figure 2:
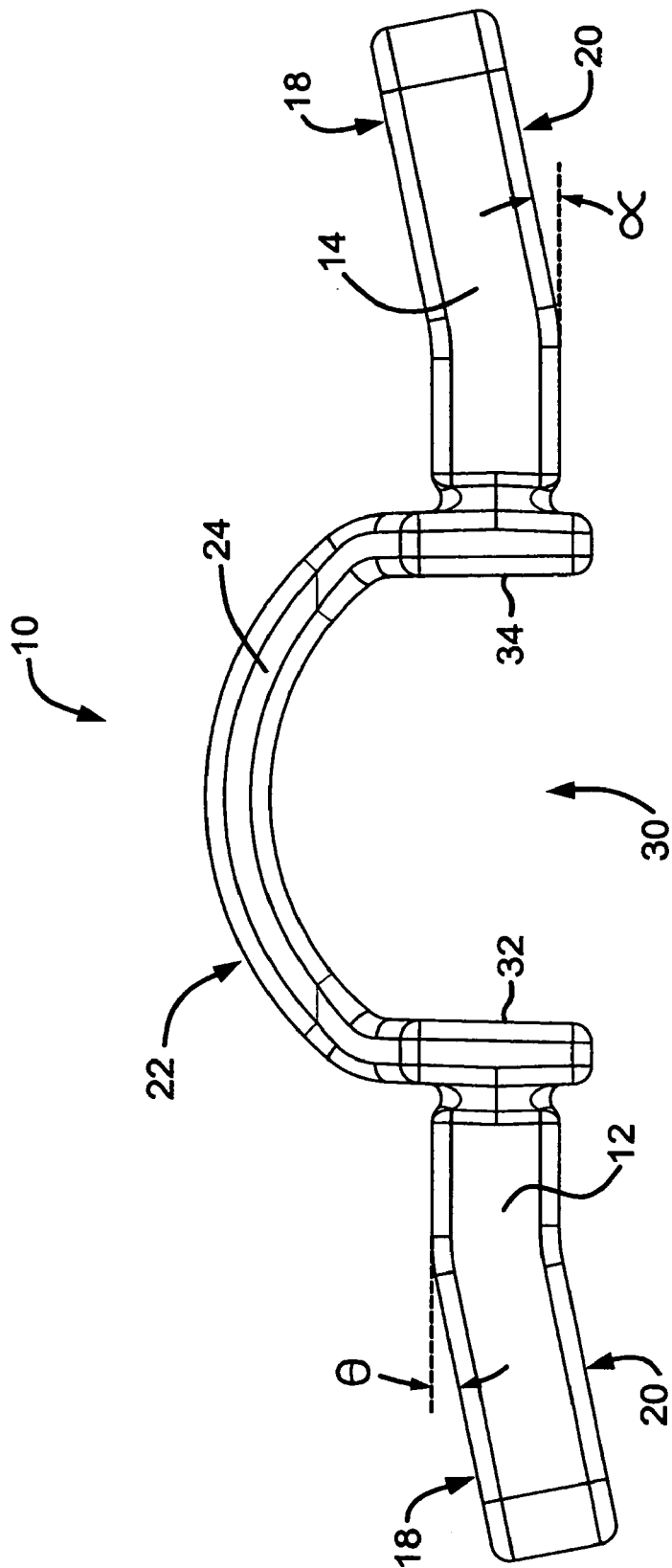
FIG. 2 is a schematic, end view of the bracket of FIG. 1.

Referring now to FIGS. 1 and 2, one embodiment of a suspension bracket 10 of the present invention is schematically depicted. The suspension bracket 10 has a first tab 12 and a second tab 14. The tabs 12, 14 preferably each have two apertures 16 located therethrough. The apertures 16 extend from an upper surface 18 to a lower surface 20 of each tab 12, 14. As oriented on the page in FIG. 2, the first tab 12 is preferably angled downwardly at an angle $\theta$ from the horizontal and the second tab 14 is angled upwardly at an axle a from the horizontal. The angles $\theta$ and $\alpha$ account for the caster, or tilt, of the axle forward or backward relative to the vehicle. It should be appreciated that other angles than $\theta$ and $\alpha$ depicted in the figure, or no angles at all, may be used without departing from the scope of the present invention.

The tabs 12, 14 are connected together by an arch portion 22 of the bracket 10. The arch portion 22 is preferably comprised of a first arch 24 and a second arch 26. The arches 24, 26 are separated from one another by a gap 28. An end of each arch 24, 26 is attached to each tab 12, 14. Preferably, the tabs 12, 14 are one-piece and integrally formed with both arches 24, 26.

The arches 24, 26 are preferably curvilinear in nature and extend from one upper surface 18 of one tab 12 to another upper surface 18 of the other tab 14. A channel 30 is defined beneath the arches 24, 26 and between the first tab 14 and the second tab 14.

While the figures depict an arch portion 22 comprised of two curvilinear arches 24, 26, it should be appreciated that the tabs 12, 14 can be connected in other ways. For example, the arch portion 22 can be solid, slotted, and/or comprised of a plurality of arches. Additionally, the arch portion 22 can connect anywhere on the tabs, 12, 14, such as a side surface 32, 34 of the tabs 12, 14, respectively.

Figure 3:
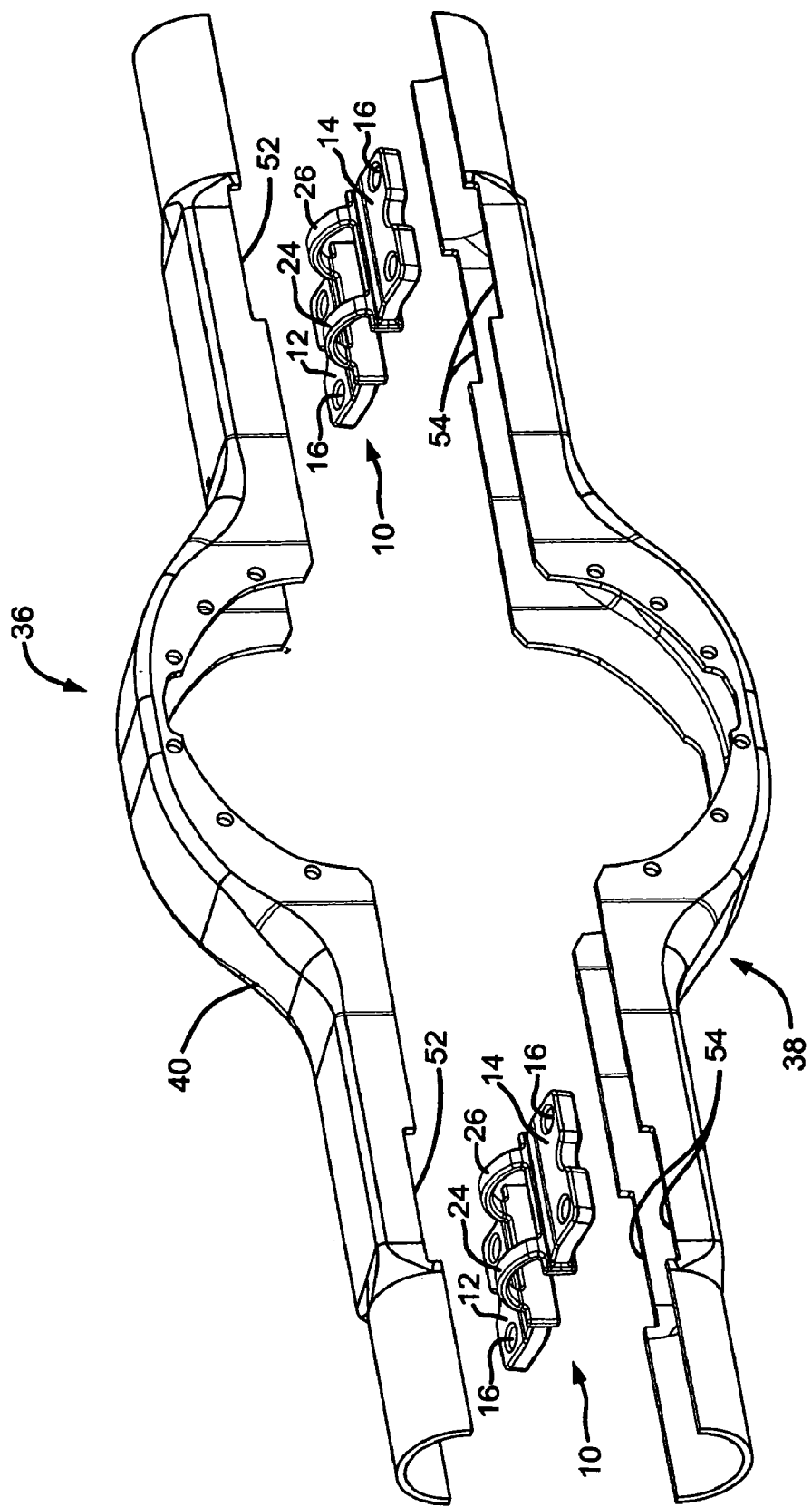
FIG. 3 is a schematic, exploded, perspective view of one embodiment of the present invention.

As best seen in FIG. 3, at least one suspension bracket 10 is located between an upper portion 36 and a lower portion 38 of an axle housing 40. The axle housing 40 is comprised of the upper portion 36, the lower portion 38, and two axle arms 42 connected together by a differential housing 44. The differential housing 44 is enclosed by front and back covers (not shown) and has a substantially hollow portion 46 for receiving a differential (not shown) for a vehicle.

Figure 4:
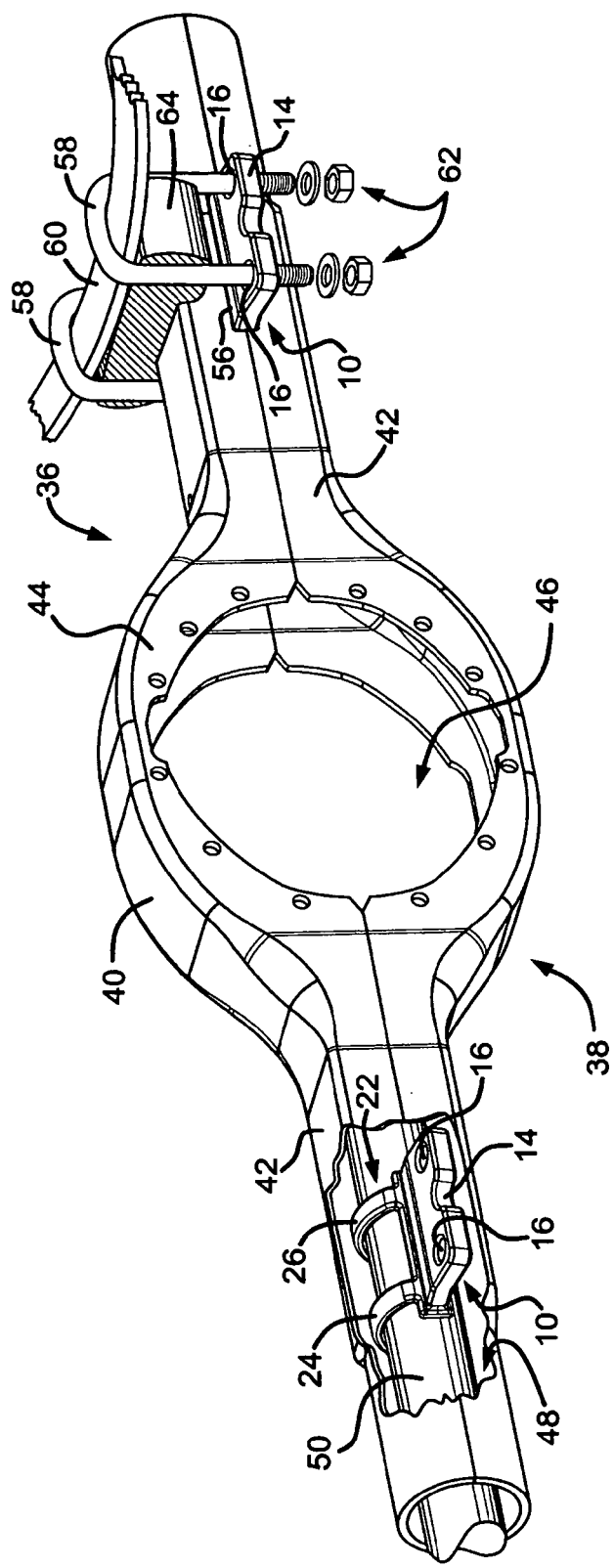
FIG. 4 is a schematic, assembled perspective view of the present invention.

The axle arms 42 also have a substantially hollow portion 48 and are designed to receive axle shafts 50, one of which is seen in FIG. 4. The axle shafts 50 are connected to the differential. The differential, being connected to a source for rotational energy, such as an internal combustion engine (not shown), by way of example only, in turn provides rotational energy to the axle shafts 50. Those skilled in the art appreciate that the axle shafts 50 can be connected to hubs (not shown). Wheels (not shown) are mounted on the hubs to enable the vehicle to move over the ground.

Preferably, the upper portion 36 has channels 52 that are aligned with one another in the axle arms 42 and the lower portion 38 has channels 54 that are also aligned with one another in the axle arms 42. The channels 52, 54 combine, when the upper and lower portions 36, 38 are brought together as described below, to create apertures 56 in the axle arms 42. The apertures 56 receive the tabs 12, 14 of the suspension bracket 10. Preferably, the apertures 56 are substantially rectangular to receive the tabs 12, 14, which are themselves substantially rectangular.

While the figures depict channels 52, 54 in the upper portion 36 and the lower portion 38 to create the apertures 56, it can be appreciated that the apertures 56 can be just formed in the upper portion 36 or the lower portion 38 without departing from the scope or spirit of the present invention.

A method of assembling the axle housing 40 with the suspension brackets 10 described above comprises locating a suspension bracket 10 in each aperture 56 in the axle arms 42. Preferably, each suspension bracket 10 is located in each axle arm 42 such that the arch portions 22 are located within the axle housing 40 and the tabs 12, 14 extend outwardly from the axle housing 40. The arch portions 22 preferably extend into the upper portion 36 of the axle housing 40. It is also within the scope of the present invention for the arch portions 22 to extend beneath the axle shaft 50 and into the lower portion 38 of the axle housing 40.

Preferably, the arch portion 22 of each suspension bracket 10 extends over each axle shaft 50 and does not interfere with the rotation of the shafts 50. The tabs 12, 14 of the suspension brackets 10 extend outwardly from the axle housing 40. Thus, the axle shaft 50 resides substantially within the channels 30 of the suspension brackets 10.

The upper portion 36 of the axle housing 40 is brought adjacent the lower portion 38 of the axle housing 40. Preferably, the upper portion 36 is welded to the lower portion 38 where the two portions 36, 38 intersect. It is also preferred that the tabs 12, 14 of each suspension bracket 10 are welded to the axle housing 40 where the axle housing 40 is closed about the tabs 12, 14. Preferably, the suspension brackets 10 are welded in place at substantially the same time and via the same seam weld used to connect the upper portion 36 to the lower portion 38. It can be appreciated that the suspension brackets 10 are thus securely and easily attached to the axle housing 40.

In the example depicted in the figures, U-shaped bolts 58 are located about a suspension member of the vehicle, such as a leaf spring 60. The ends of the bolts 58 are located through the apertures 16 in the tabs 12, 14. Fasteners 62, such as washers and nuts, can be threaded onto the ends of the bolts 58 extending through the apertures 16. A spacer 64 may be located between the U-bolt 58 and the axle housing 40. It can be appreciated that the suspension member is now securely attached to the axle housing 40 with the suspension bracket 10. It can also be appreciated that various other suspension members and structures can be attached to the bracket 10 besides leaf springs.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A suspension mounting system, comprising:
    an axle housing having two hollow arms each comprising an upper portion and a lower portion; and
    at least one suspension bracket of a vehicle located between said upper portion and said lower portion and through an interior portion of and past an outer surface of one of said hollow arms.

2. The suspension mounting system of claim 1, wherein said at least one suspension bracket has an arch portion that is one-piece and integrally formed with two tabs.

3. The suspension mounting system of claim 2, wherein said arch portion has two arches separated from one another by a gap and each of said arches is separately connected to each of said tabs.

4. The suspension mounting system of claim 1, wherein each of said tabs has at least one aperture for receiving a mechanical fastener therethrough.

5. The suspension mounting system of claim 2, wherein said arch portion spans over an axle shaft within said axle housing.

6. The suspension mounting system of claim 2, wherein said tabs extend outwardly from said axle housing.

7. A suspension mounting system, comprising:
    a suspension bracket having two tabs separated by at least one arch; and
    an axle housing having at least one arm for receiving said arch of said suspension bracket within a hollow portion of said arm, said tabs extending outwardly from said housing.

8. The suspension mounting system of claim 7, wherein said two tabs and said at least one arch are integrally formed and one-piece.

9. The suspension mounting system of claim 7, wherein said suspension bracket has two arches separated from one another by a gap and wherein each of said arches connects one tab with the other tab.

10. The suspension mounting system of claim 7, wherein said arches are located within said arm of said axle housing and span over an axle shaft and said tabs extend through rectangular apertures in said axle housing.

11. A suspension mounting system, comprising:
    a drive axle housing having two hollow arms connected together by a differential housing, said each of the hollow arms and differential housing having an upper portion and a lower portion; and
    two one-piece, integrally formed suspension brackets each having an arch portion connecting two tabs, said tabs each defining at least one aperture, said arch portion of each suspension bracket being located within said one of said arms and said tabs extending outwardly from said arms.

12. A method of assembling a suspension mounting system, comprising:
    providing a drive axle housing having an upper portion and a lower portion;
    locating an arch portion of a suspension bracket within said drive axle housing and between said upper portion and said lower portion; and
    securing said upper portion to said lower portion and securing said suspension bracket to said secured upper portion and said lower portion, said suspension bracket having two tabs that extend outwardly from said secured upper portion and said lower portion.

13. The method of claim 12, wherein said arch portion spans over an axle shaft located in said drive axle housing.

14. The method of claim 12, wherein said upper portion is secured to said lower portion by welding and said suspension bracket is secured to said axle housing via the same weld used to secure said upper portion to said lower portion and substantially at the same time said upper portion is secured to said lower portion.

15. The method of claim 12, wherein each of said tabs has two apertures, said apertures receiving ends of U-shaped bolt that is located about a leaf spring of a vehicle.

* * * * *